US008627130B2

(12) United States Patent
Dickson

(10) Patent No.: US 8,627,130 B2
(45) Date of Patent: Jan. 7, 2014

(54) POWER SAVING ARCHIVE SYSTEM

(75) Inventor: Lawrence John Dickson, National City, CA (US)

(73) Assignee: Bridgette, Inc., El Cajon, CA (US)

( * ) Notice: Subject to any disclaimer, the term of this patent is extended or adjusted under 35 U.S.C. 154(b) by 283 days.

(21) Appl. No.: 12/900,771

(22) Filed: Oct. 8, 2010

(65) Prior Publication Data

US 2011/0087912 A1   Apr. 14, 2011

Related U.S. Application Data

(60) Provisional application No. 61/249,879, filed on Oct. 8, 2009.

(51) Int. Cl.
*G06F 1/00* (2006.01)
*G06F 1/32* (2006.01)
*G06F 13/00* (2006.01)

(52) U.S. Cl.
USPC ........... 713/324; 713/320; 711/122; 711/130; 711/142; 711/161

(58) Field of Classification Search
USPC ........... 713/300, 310, 320, 323–324; 710/74; 709/217–218; 711/117–118, 122, 130, 711/133, 136, 147–149, 154, 159–162, 142
See application file for complete search history.

(56) References Cited

U.S. PATENT DOCUMENTS

| | | |
|---|---|---|
| 5,423,046 A | 6/1995 | Nunnelley et al. |
| 5,845,291 A | 12/1998 | Winokur |
| 6,400,892 B1 | 6/2002 | Smith |
| 6,496,915 B1 | 12/2002 | Halleck |
| 6,583,947 B1 | 6/2003 | Hakamata et al. |
| 6,826,005 B2 | 11/2004 | Hakamata et al. |
| 6,947,240 B2 | 9/2005 | Hakamata et al. |
| 6,961,815 B2 | 11/2005 | Kistler et al. |
| 7,035,972 B2 | 4/2006 | Guha et al. |
| 7,210,005 B2 | 4/2007 | Guha et al. |
| 7,275,166 B2 | 9/2007 | Kaiju et al. |
| 7,475,265 B2 | 1/2009 | Oshikawa et al. |
| 2002/0144057 A1* | 10/2002 | Li et al. ......................... 711/112 |

(Continued)

OTHER PUBLICATIONS

Levine, Ron. "NAS Advantages: A VARs View". Infostor. Online Apr. 1, 1998. Retrieved from Internet Feb. 25, 2013. <http://www.infostor.com/index/articles/display/55961/articles/infostor/volume-2/issue-4/news-analysis-trends/nas-advantages-a-vars-view.html>.*

(Continued)

*Primary Examiner* — Thomas J Cleary
(74) *Attorney, Agent, or Firm* — Chen Yoshimura LLP

(57) ABSTRACT

A power saving archive system includes a front storage system accessible by clients and one or more back storage systems connected to the front storage system. A client file received by the front storage system is written to one of the back storage systems, while the front storage system stores a reference to the file and deletes the file from the front storage system after a certain time period. Each back storage system enters an inactive state (e.g. a powered off state) after a period of unuse, and can become active again in response to a wakeup command (e.g. a Wake-on-LAN signal) from the front storage system. Upon receiving a file read request from a client, the front storage system wakes up the appropriate back storage system, restores the file from the back storage system, and provides the file to the client.

19 Claims, 6 Drawing Sheets

(56) References Cited

U.S. PATENT DOCUMENTS

| | | | |
|---|---|---|---|
| 2004/0054748 A1* | 3/2004 | Ackaouy et al. | 709/214 |
| 2004/0054939 A1 | 3/2004 | Guha et al. | |
| 2004/0068672 A1 | 4/2004 | Fisk et al. | |
| 2004/0111558 A1 | 6/2004 | Kistler et al. | |
| 2004/0133540 A1 | 7/2004 | Saake et al. | |
| 2004/0205232 A1 | 10/2004 | Matoba et al. | |
| 2005/0188252 A1 | 8/2005 | Amano | |
| 2005/0257000 A1 | 11/2005 | Sonoda et al. | |
| 2005/0268119 A9 | 12/2005 | Guha et al. | |
| 2005/0273638 A1 | 12/2005 | Kaiju et al. | |
| 2006/0075190 A1* | 4/2006 | Higaki et al. | 711/114 |
| 2006/0129761 A1 | 6/2006 | Guha et al. | |
| 2007/0079087 A1 | 4/2007 | Wang et al. | |
| 2007/0143559 A1* | 6/2007 | Yagawa | 711/170 |
| 2007/0208921 A1* | 9/2007 | Hosouchi et al. | 711/170 |
| 2007/0220198 A1* | 9/2007 | Kassai | 711/112 |
| 2007/0220316 A1 | 9/2007 | Guha et al. | |
| 2007/0260815 A1 | 11/2007 | Guha et al. | |
| 2008/0072000 A1* | 3/2008 | Osaki et al. | 711/162 |
| 2009/0006877 A1 | 1/2009 | Lubbers et al. | |
| 2009/0049240 A1 | 2/2009 | Oe et al. | |
| 2009/0119530 A1 | 5/2009 | Fisk et al. | |
| 2009/0177837 A1* | 7/2009 | Kaneda | 711/112 |
| 2009/0198886 A1 | 8/2009 | Balakrishnan | |
| 2010/0115305 A1* | 5/2010 | Ichikawa et al. | 713/320 |
| 2011/0231683 A1* | 9/2011 | Kumasawa et al. | 713/320 |

OTHER PUBLICATIONS

International Search Report and Written Opinion in counterpart PCT application No. PCT/US2010/052006, dated Dec. 13, 2010.

* cited by examiner

POWER SAVING ARCHIVE SYSTEM

This application claims priority under 35 USC 119(e) from U.S. provisional patent application No. 61/249,879, filed Oct. 8, 2009, which is herein incorporated by reference in its entirety.

BACKGROUND

1. Field of the Invention

This invention relates to storage systems. In particular, it relates to a power saving archive system.

2. Description of the Related Art

List of Patent References:

A. Nunnelley, Lewis L; Williams, Larry L; Wood, Jr, Leighton C: High Capacity Data Storage System using Disk Array. Issued Jun. 6, 1995: U.S. Pat. No. 5,423,046.
B. Winokur, Alex: Computer with Reduced Power Consumption. Issued Dec. 1, 1998: U.S. Pat. No. 5,845,291.
C. Smith, Gordon J: Adaptive Disk Drive Operation with Medium Speed and Recording Location based on Data Type. Issued Jun. 4, 2002: U.S. Pat. No. 6,400,892.
D. Hakamata, Kazuo; Takamoto, Kenichi; Kobayashi, Masaaki: Disk Array Unit. Issued Jun. 24, 2003: U.S. Pat. No. 6,583,947. Continuations: U.S. Pat. Nos. 6,826,005 and 6,947,240.
E. Halleck, Michael D: Apparatus and Method for Reducing Power Consumption in an Electronic Data Storage System. Issued Dec. 17, 2002: U.S. Pat. No. 6,496,915.
F. Kistler, Michael David; Rajamony, Ramakrishnan: Multiple Disk Data Storage System for Reducing Power Consumption. Issued Nov. 1, 2005: U.S. Pat. No. 6,961,815. Continuation: U.S. patent application publication number 20040111558.
G. Fisk, Ian; Mojaver, Michael: Lower Power Disk Array as a Replacement for Robotic Tape Storage. Filed Mar. 21, 2003. U.S. Patent application publication number 20040068672. Continuation: U.S. patent application publication number 20090119530.
H. Guha, Aloke; Santilli, Chris T; McMillian, Gary B: Method and Apparatus for Power-Efficient High-Capacity Scalable Storage System. Issued Apr. 25, 2006: U.S. Pat. No. 7,035,972. Continuations: U.S. Pat. No. 7,210,005; U.S. patent application publication numbers 20040054939, 20050268119, 20060129761, and 20070220316.
I. Amano, Takashi: Data Storage Systems and Methods. Filed Feb. 25, 2004. U.S. Patent application publication number 20050188252.
J. Kaiju, Yoshihiko; Yoshida, Shoichi; Murakawa, Yoshitaka; Futamata, Akio; Ito, Katsuyoshi: Power Saving Control System and Power Saving Control Method. Issued Sep. 25, 2007: U.S. Pat. No. 7,275,166. Continuation: U.S. patent application number 20050273638.
K. Oshikawa, Hiroshi; Saitoh, Hirofumi: Data Storage Device and Control Method for Power-Saving Modes of Serial Interface Thereof. Issued Jan. 6, 2009: U.S. Pat. No. 7,475,265.
L. Lubbers, Clark Edward; DeCenzo, David Peter: Power Management in a Storage Array. Filed Jun. 28, 2007. U.S. Patent application publication number 20090006877.

In the discussions to follow, patents and their continuation applications are referenced by their letters in the above list, and/or by their inventors or their numbers.

The majority of the above-referenced documents consists of disk arrays with a single master controller or CPU in communication with data storage users or hosts. This includes A, B, C, D, F, H, and K, and most of E, G and L. Such arrays include MAID systems (H), RAID-based systems (H, L), systems that organize files into clusters on selected disks (A, H), systems that cache data into semiconductor memory or flash memory (B, E), and even systems that work with the space between platters on a disk (C).

However, power saving on a disk level proves to have two drawbacks. First, not much power is saved. Typical MAID performance is 30% to 40% power saving, due to the continued demands of CPU, fan and other power users in the enclosure. They require a controller (G) for all the disks, quiescent or not.

Second, complexity tends to skyrocket as the size (measured in number of disks) moves beyond the capacity of one enclosure. This also results in latencies and trouble with data throughput.

Having to micro-manage data via involvement in RAID, cache, or file characteristics (C, F, J) is another drawback of many of the references. Powering down and up are major disturbances in data flow. If the same control mechanism that causes these massive effects must be involved in delicate details of a file system, there is built-in danger of instability and race conditions that can result in data corruption.

Micro-management is also a problem in K, as the host has to control the power saving function by explicit commands.

SUMMARY

For better scalability and power savings, one approach is to build a power saving storage out of whole systems with CPUs and not just sets of disks. These whole systems can be almost completely shut down and awakened at will. A swap design (see reference I above) is applicable to such a setup, if 50% duty cycle is OK. But the swap nature of reference I does not allow the rarely-used storage to be specialized for its role.

References E, G, J, and L are also to greater or less degree applicable to the multi-system storage approach, although the techniques they discuss are focused on the disk-level arrays and thus inadequate to get the real best advantage out of the multi-system approach. There is therefore a need for a multi-system power saving array design that can take real advantage of the high power-off savings of whole systems. However, random access to data that is scattered around such giant groupings as a multi-disk storage system, for example, even an 8-disk 1U (12 TB with 2TB disks and RAID6), will keep "tweaking" them and powering them up, even if the rate of data access is quite low. A touch on one file is all that is needed. Thus, technologies that deal in data typing and access characteristics (like references C, F, J above) will not get good results.

The inventor of the present invention realized that many use patterns are not random, and have a tendency to feed data into storage in time order, data that after a short period is very rarely accessed, and when it is accessed it is in time-associated clumps. Technology of the embodiments of the present invention takes advantage of this restricted use case scenario to break free of the "busy problem" and get full advantage of the almost-100% power savings possible in systems that can be waked by a network signal.

Accordingly, the present invention is directed to a power saving archive system and related methods that substantially obviates one or more of the problems due to limitations and disadvantages of the related art.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a data archive system which includes a front storage system, one or more back storage systems connected to the front storage system, and a data connection for connecting the front storage system to one or more clients, wherein in response to a write command from a client, the front storage system receives a client file from the client and writes the client file to one of the back storage systems, and wherein each back storage system enters an inactive state after a predetermined time period of unuse, and wherein each inactive back storage system becomes active in response to receiving a wakeup command from the front storage system.

Further, after writing the client file to one of the back storage systems, the front storage system stores a reference to the client file and deletes the client file from the front storage system after a predetermined period of unuse. In response to a read command from a second client, the front storage system transmits the wakeup command to a selected back storage system, reads a client file from the selected back storage systems, and transmits the client file to the second client.

In the data archive system, the front storage system may include a server and a mass storage device, and each back storage system may include a server and a mass storage device. The inactive state of the back storage systems may be a powered off state and the wakeup command may be a Wake-on-LAN signal.

In another aspect, the present invention provides a data archiving method implemented in a data archive system, the data archive system including a front storage system and a plurality of back storage systems connected to the front storage system, where the method includes: receiving a client file from a client by the front storage system; writing the client file in one of the plurality of back storage systems; each of the plurality of back storage systems entering an inactive state after a predetermined time period of unuse; and each inactive back storage system becoming active in response to receiving a wakeup command from the front storage system.

The method may further include: storing a reference to the client file in the front storage system; and deleting the client file from the front storage system after a predetermined period of unuse of the client file.

The method may further include: in response to a read command from a second client, the front storage system transmitting the wakeup command to a selected back storage system, reading a client file from the selected back storage systems, and transmitting the client file to the second client.

It is to be understood that both the foregoing general description and the following detailed description are exemplary and explanatory and are intended to provide further explanation of the invention as claimed.

DETAILED DESCRIPTION OF THE PREFERRED EMBODIMENTS

Figure 1:
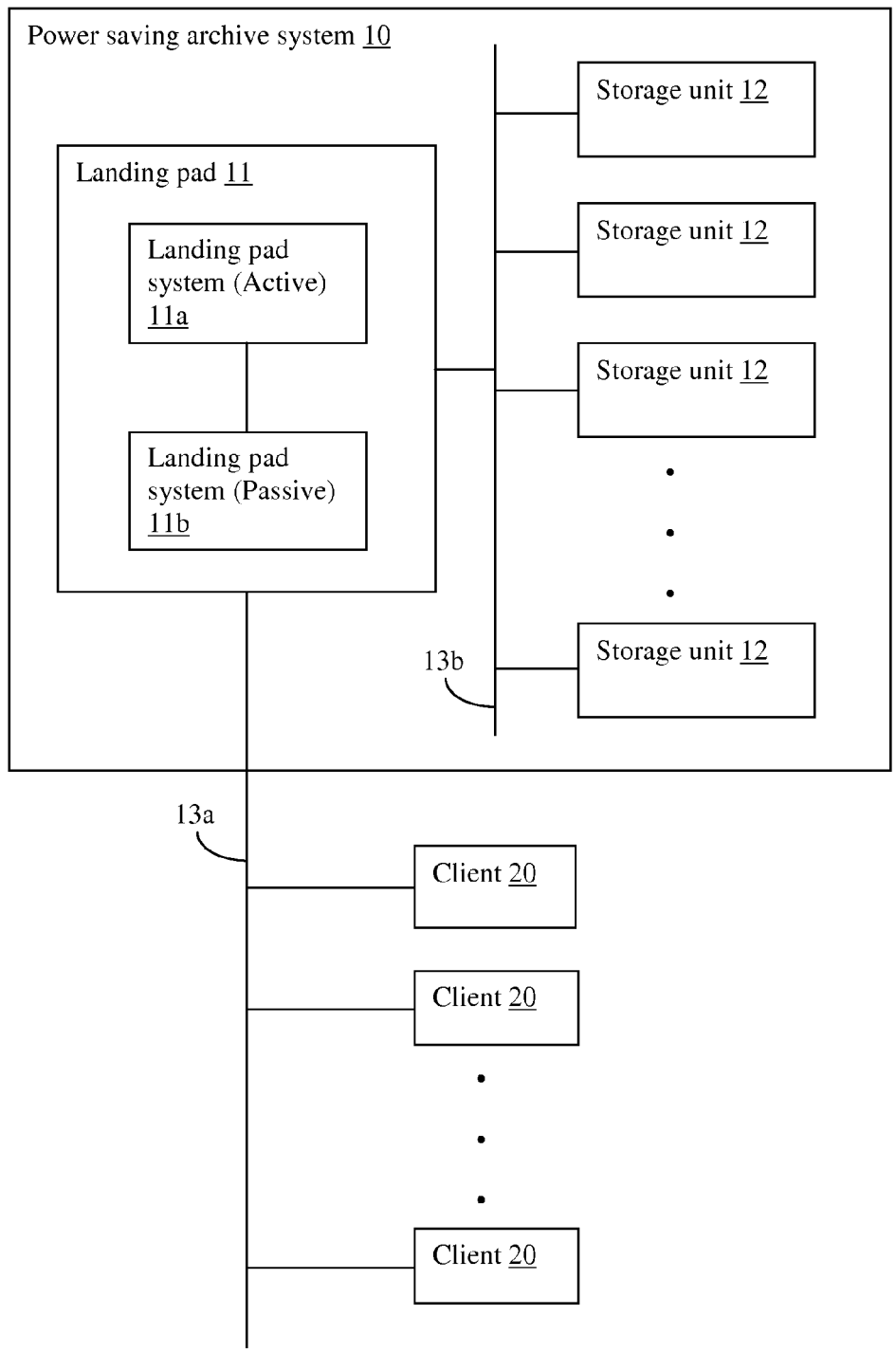
FIG. 1 schematically illustrates a power saving archive (PSA) system according to an embodiment of the present invention.

In this disclosure, embodiments of the invention are sometimes referred to as the "power saving archive" or "PSA" for convenience. However, the use of such terms does not in any way limit the scope of the invention.

The power saving archive (PSA) system stores large amounts of computer-readable data on multiple storage systems, each with large data storage capability, in such a way as to require little power usage under a common use case, and to make the data available quickly on demand. The power saving archive system also achieves cost saving through simplicity of design, using commonly available features of systems (as opposed to disks and other slave devices) and standard software.

The storage units are independent systems, negotiating as equals through protocols over a network, not slave devices such as disks driven via a controller by a master. This gives far greater power savings possibilities (e.g., Wake-on-LAN vs MAID). It allows simplicity, using commercially available hardware and software, and thus is also more easily maintainable.

There is a strong differentiation between the functions of the front storage system (also referred to as the landing pad) and the back storage system (also referred to as the storage units). The front storage communicates with clients and holds much-used recent data ready for access, while assuring that the data is stored in the back storage. The back storage holds archived data and is usually in an inactive state (e.g., powered off), but is capable of becoming active quickly when demanded.

This allows differential optimization of the two designs, which is critical to cost savings and responsiveness. It makes the PSA system more secure since only the front storage deals with external clients directly.

Embodiments of the present invention use a mechanism for back storage to enter an inactive state at very low power, after a quiescent period, and be reawakened at the command of the front storage when needed. Wake-on-LAN, implemented on the motherboard (BIOS) of a computer or network interface, is one robust and widespread example of such a mechanism. Such a mechanism is important for the very high power savings that differentiate embodiments of the present invention from MAID. The mechanism can be implemented with a standard network and switch, relatively cheap and easy to maintain compared with the tightly coupled controller-slave arrays of most of the competing art. Other techniques that can be used for this purpose include InfiniBand or FireWire for very fast archive networks, and peer-to-peer USB (e.g., a USB link and network cable that provides host-to-host networking and linking for two or more USB hosts) for sets of small archives. Remote wake up from a sleep state on such systems may be achieved by suitable hardware. It is not necessary for the client connection and the archive network to use the same technology.

More generally, in this disclosure, the term "inactive state" refers to a low power state of the back storage system in which the back storage system is not required to engage in file read and write activities but is capable of detecting a wakeup command from the front storage system. It should be noted that in the inactive state, the back storage system may still perform certain auxiliary functions such as to indicate its status and identity. In response to the wakeup command, the back storage system starts itself up and enters an active state. The active state is a state in which the back storage system can perform file read and/or write as well as other associated functions such as file delete, directory upkeep, and command and data communication with the front storage system. In a preferred embodiment, the inactive state is a powered off state and the wakeup command is a Wake-on-LAN signal. There is a tradeoff or range of possibilities from the lowest power, most robust in which the back storage is fully powered off except for a Wake-on-LAN network card, through the fastest response (but more power consumption) in which the back storage is in one of several possible "sleep" states available to some motherboards and operating systems.

The flow of data unit storage (a data unit may be, for example, a file) is driven consistently with ingest time ordering of the data units. This is simple and robust to program, implying as it does a naturally sequential structure to the data flow, so it increases reliability and predictability of behavior.

Embodiments of the present invention are particularly useful in archive systems that must preserve large volumes of data unchanged for long periods. It is also adapted to the tendency of users to need time-associated clusters of archived data. Timestamp recording is supported by commercially available data organizers such as file systems, and is a great aid in finding data and useful to users.

Other design features of the PSA system may include the following:

A state machine permits a client data access protocol, such as a NAS (Network-attached storage) protocol, to be supported transparently while restarting (if necessary) and reaching data on back storage when needed, with little delay. This achieves high responsiveness. It may be done robustly using friendly features (e.g. VFS (Virtual File System)) of commercially available server data handlers such as CIFS (Common Internet File System)/Samba.

Random access of files may be restricted to a copy of the file on front storage, which can be copied and restored sequentially to/from back storage, thus gaining several advantages. A fast, mature commercially available protocol (example: FTP (File Transfer Protocol)) may be used to connect front to back storage, thus improving speed, reliability and maintenance. A copy of the file on front storage can respond instantly to repeated client access without requiring action or redesign of back storage.

Write Once, Read Many (WORM) data access may be enforced in a preferred embodiment. WORM is part of such a preferred embodiment at three levels: initial data ingest (front storage), data archiving (back storage), and archived data copy access (front storage). This offers assurance to users that require immutability of the stored data. It simplifies the design and allows use of many speed and other optimizations adapted to time-ordered WORM storage.

Changeable data may be allowed even if WORM is enforced, by causing a new file copy to be written as if it were a new file, and then keeping track in client software of its relationship to the old copy.

If WORM is not enforced, several options may be used for handling changeable data. The old copy may be deleted and a new copy written, or the old copy may be revised on its storage unit (thus requiring the old storage units be writable). Revision on the old storage unit or data updating on the new storage unit may involve diff, version control, deduplication or other technologies known in the art.

In a preferred embodiment, schematically illustrated in FIG. 1, the power saving archive (PSA) system 10 includes a landing pad (also referred to as a front storage system) 11 consisting of one or two (two are shown in FIG. 1) landing pad systems 11*a* and 11*b*, and a number of storage units (also referred to as back storage systems) 12, connected via a data connection 13*b* such as Ethernet to each other. The landing pad 11 is also connected to one or more external clients 20 via a data connection 13*a*. The connections 13*a* and 13*b* may be separate hardware or even different technologies, or they may be served by the same network hardware, in which case they may be placed on separate subnetworks for efficiency and security, or placed on the same subnetwork (less preferred).

In one embodiment, the landing pad 11 appears as Network Attached Storage to the clients 20, and the storage units 12 appear as fast file storage, for example FTP, to the landing pad. In the case of two landing pad systems 11*a* and 11*b*, one may be active and one may be passive with a Failover connection between them.

As stated earlier, the storage units 12 are independent storage systems, negotiating as equals through protocols over a network, not slave devices such as disks driven via a controller by a master.

In some use cases, which may be common to video surveillance, long term medical imaging, and other growing, high-volume applications, the word "client" has two functional meanings, and the same physical client may or may not perform both functions. A client writer records units of data (such as files), each with a timestamp that may not change during their lifetime. A client reader locates and reads such a unit of data. Such reads are frequent for a short period after the data is recorded. After that, they become rare, and when they do occur, they usually occur in timestamp-correlated clusters.

In video surveillance, for example, a client writer is a camera, while a client reader is an observer. The rare, long-delayed reading of archived files occurs during investigations, which typically target action in a period of an hour or so around an incident.

In FIG. 1, each client 20 may be a client reader or a client writer or both.

Figure 2:
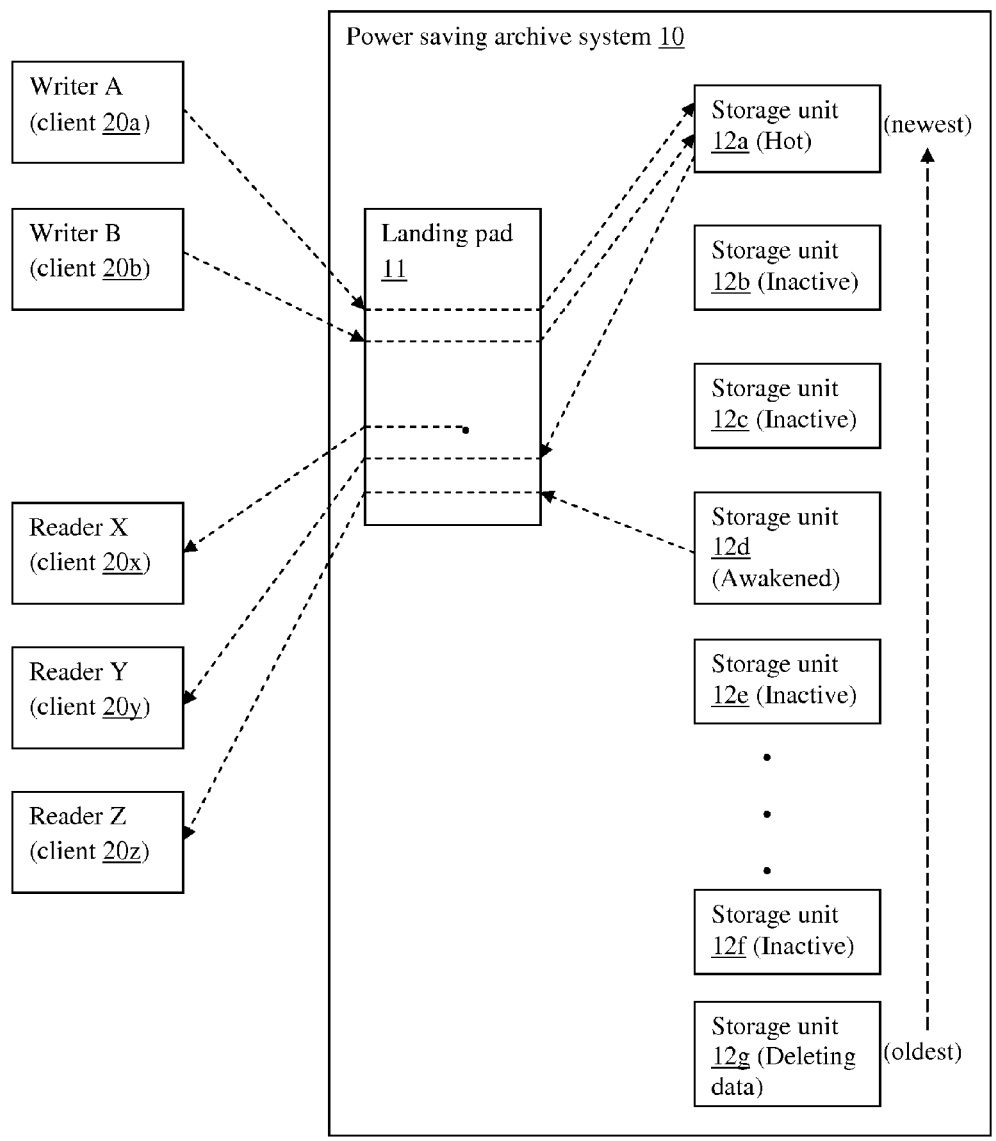
FIG. 2 schematically illustrates an exemplary use case of the PSA system.

FIG. 2 schematically illustrates an exemplary use case of the PSA system 10. In this example, a number of client writers 20*a-b* are writing data to the PSA system 10 and a number of client readers 20*x-z* are reading data from the PSA system. The PSA system 10 includes a number of storage units 12*a-g*, with storage unit 12*a* being the newest and 12*g* being the oldest in terms of user data stored on them. The newest storage unit is currently being written (referred to as "hot"). In the illustrated example, client writers A and B are writing data to the hot storage unit 12*a* via the landing pad 11. Client reader Y is reading data from the hot storage unit 12*a* via the landing pad. Client reader X is reading data that still exists in the landing pad 11. Client reader Z is reading data from a storage unit 12*d* that has been awakened after being inactive, via the landing pad. Storage units 12*b*, 12*c*, and 12*e-f* are in an inactive state, which by design can consume almost no power. The oldest storage unit 12*g* is in a state where user data stored thereon are being deleted to make space available for new user data. The various states of the storage units mentioned here will be described in more detail later.

In one preferred embodiment, the NAS share (a Samba share) presented by the landing pad 11 offers symlinks (more generally, any suitable type of reference) to the clients 20.

Also in the share are subdirectories, invisible to the clients, in which actual data is stored, pointed to by the symlinks. There may also be related metadata. Some of the symlinks may be dangling (point to nonexistent files or even to files in a nonexistent directory). The passive landing pad system 11*b*, if it exists, possesses copies of all the symlinks but no data.

Each file in this preferred embodiment has a Write Once Read Many (WORM) history on three levels. Within the landing pad 11 as a hot archive file it is created, written once by a client, read at least once (in order to be written to a storage unit; it may or may not be read again by clients), and deleted, in that order. Within the storage unit 12 it is created, written once, read zero or more times (for client archive reads), and deleted. Within the landing pad 11 as an archive read file it is (re)created, written once (for example by FTP fetch), read at least once (by the client whose read request caused the archive read, and perhaps by other client reads), and deleted. Thus, each file has one WORM history as a hot archive file, one WORM history as a storage unit file, and zero or more WORM histories as an archive read file. The hot archive file and the archive read file are preferably Posix (Portable Operating System Interface) files. It can retain the same symlink and/or metadata during this entire sequence of events, until the last copy is deleted both from the landing pad 11 and from the storage unit 12.

The state of the files (file lifetime) on the landing pad 11 is described in more detail with reference to FIG. 3. In this figure, the circles and half circles represent states of a file, and the arrows indicate the movement from one state to another.

As illustrated, in state F.W1*a*, the file is being written by a client to the landing pad (e.g. using Samba). In state F.W1*b*, which follows shortly after state F.W1*a*, the file is being written from the landing pad to the hot storage unit (12*a* in FIG. 2). After that, the file exists in the landing pad in an idle state (F.R1*a*).

In state F.R2, the file is being purged from the landing pad. Purging can happen before or after the hot storage unit becomes inactive. After purging, the file is in a purged state (F.R3) in which the file is deleted and its symlink remains in the landing pad but is dangling (i.e. pointing to a nonexistent file). The purged file may be opened (state F.R4), i.e. read back into the landing pad from a storage unit where it has been stored, by using the dangling symlink. In state F.R1*b*, the file in the landing pad is being read by a client (e.g. using Samba).

A file may be read by clients many times. If the file is in state F.R1*a* at the time of a client read request, reading will cycle between states F.R1*a* and F.R1*b*, without requiring data retrieval from a storage unit. If the file is in state F.R2 or F.R3 at the time of a client read request, the file will go through state F.R4 (i.e. reading back from a storage unit) to reach state F.R1*b* (read by a client). States F.R1*a* and F.R1*b*, F.R2, F.R3 and F.R4 form a complete cycle.

In state F.D, the file is being deleted from the landing pad (as well as the storage unit if a copy is stored there).

In state F.W1*a*, the Samba file on the landing pad is writable by one client. In states F.R1*a*, F.R1*b* and F.R3, the Samba file is read-only by any client. In states F.W1*b*, F.R2, F.R4 and F.D, the Samba file is locked (inaccessible) against all clients.

Figure 3:
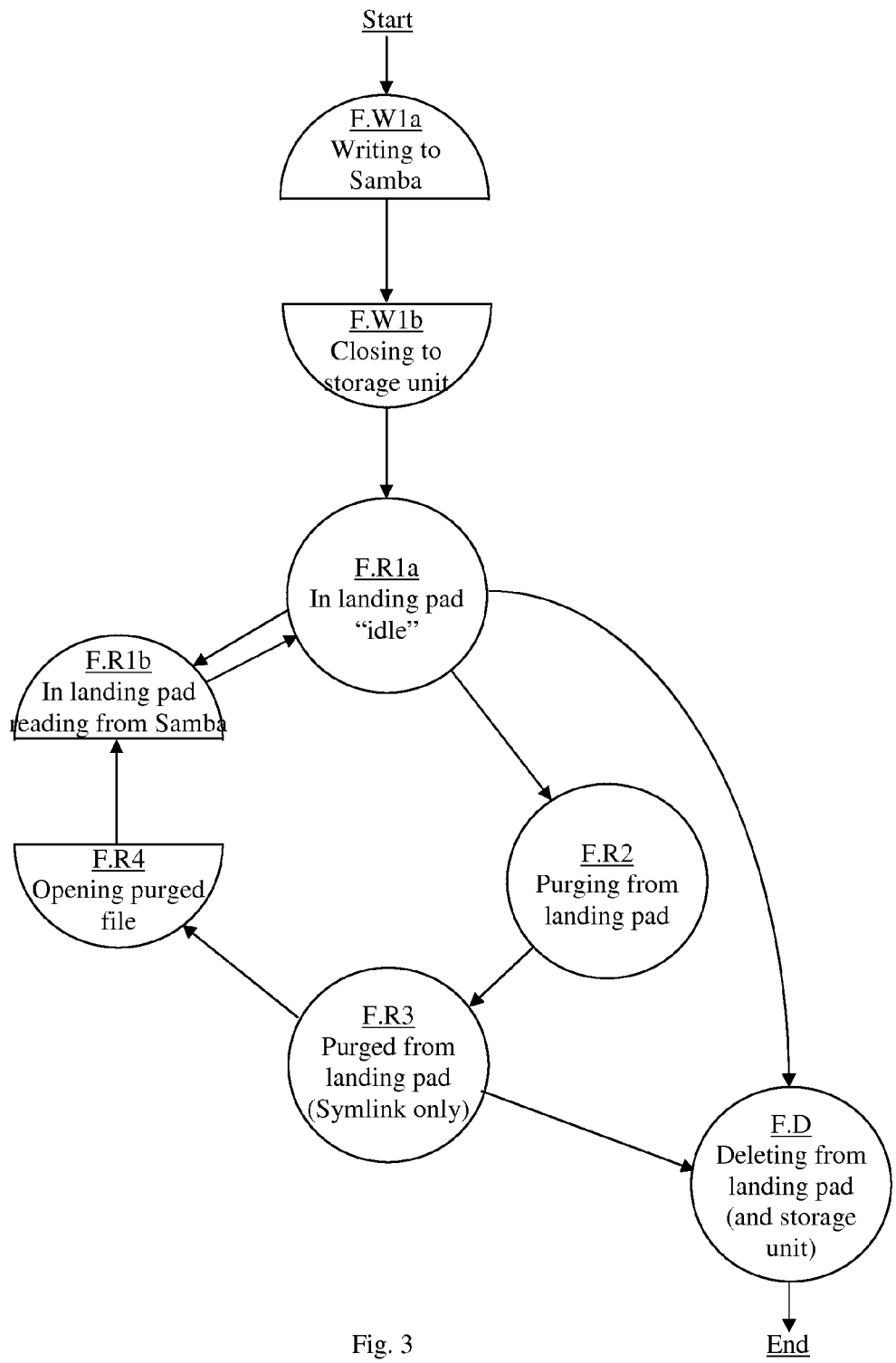
FIG. 3 schematically illustrates the states of a file on the front storage system of the PSA according to an embodiment of the present invention.

It should be noted that the behavior of the landing pad 11 and the storage units 12 must support the state machine of FIG. 3, in the context of multiple clients and multiple files, moving possibly concurrently. In a single landing pad and storage unit, at one time, it is possible for files to be read or written that are in many different states according to FIG. 3.

Preferably, every write and read to/from the storage unit is sequential. For maximum efficiency, each landing pad write and read is preferably also sequential. Also for maximum efficiency, the write to the storage unit preferably happens immediately after the write of the hot archive file to the landing pad, and the read from the archive read file preferably happens immediately after the read from the storage unit, so as to take advantage of file system caching on the landing pad. Given enough caching memory, this may cut the disk activity on the landing pad in half, and may eliminate most seeks.

Each storage unit 12 enters an inactive state (e.g., powered off except for network connection) after being left unused (e.g., no read or write activities) for a predetermined period of time. When the landing pad 11 detects an unsatisfied request for data on an inactive storage unit 12, it uses Wake-on-LAN or other suitable methods to wake up that storage unit. Then the landing pad fetches the file and other data it may need from that storage unit. After being left unused (e.g., no read or write activities) for a predetermined time period, the storage unit becomes inactive again.

The states of a storage unit 12 are described in more detail with reference to FIG. 4. In this figure, the circles represent states of the storage unit, and the arrows indicate the movement from one state to another.

In state A.W1*a*, the storage unit is being filled with files by the landing pad. In state A.W1*b*, the storage unit is being filled with files and also serving files for reading to the landing pad. States A.W1*a* and A.W1*b* are read/write states, and typically represent the states of a hot storage unit (e.g. 12*a* in FIG. 2). In state A.W2, the storage unit cycles down (from a read/write state) and becomes inactive.

In state A.R1*a*, the storage unit is idle (i.e., it is active but has no current read or write activities). In state A.R1*b*, the storage unit is serving files for reading to the landing pad. States A.R1*a* and A.R1*b* are read-only states, and may represent the states of a storage unit that has been re-awakened (e.g. 12*d* in FIG. 2) or a storage unit that has just been filled but has not yet become inactive. In state A.R2, the storage unit cycles down (from a read-only state) and becomes inactive.

In state A.D1, the files on the storage unit are being deleted. In state A.D2, the storage unit cycles down (from the file deleting state) and becomes inactive.

States A.D1 and A.D2 correspond to the file deletion and recycling of an entire storage unit, i.e. the oldest storage unit 12*g* in FIG. 2. Optionally (not shown in FIG. 4), data on the oldest storage unit 12*g* may be transferred to an external storage device such as a tape drive before file deletion.

In states A.W2, A.R2, A.D1 and A.D2, the storage unit is locked and inaccessible to the landing pad.

The horizontal movements of states from A.W1*a* to A.R1*a* to A.D1 and back to A.W1*a* are cyclic and correspond to the storage unit being reused after its data has aged enough to be discarded.

Figure 4:
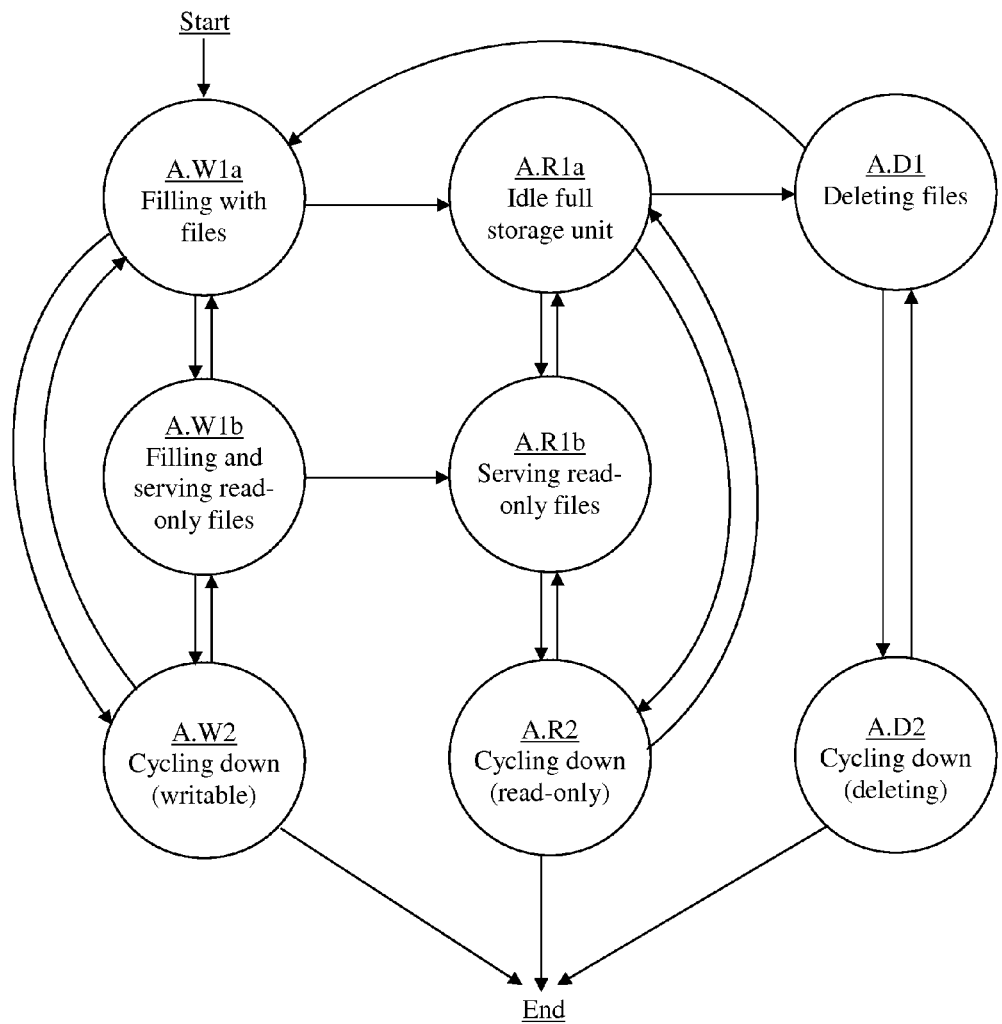
FIG. 4 schematically illustrates the states of a back storage system of the PSA according to an embodiment of the present invention.

As seen in FIG. 4, it is possible for the storage unit to enter the cycling down states (A.W2, A.R2 and A.D2) at any time. After cycling down and becoming inactive, the storage unit can move from the inactive state back to state A.W1*a*, A.W1*b*, A.R1*a*, A.R1*b* or A.D1. The process of cycling down of a storage unit is shown in more detail in FIG. 5.

Figure 5:
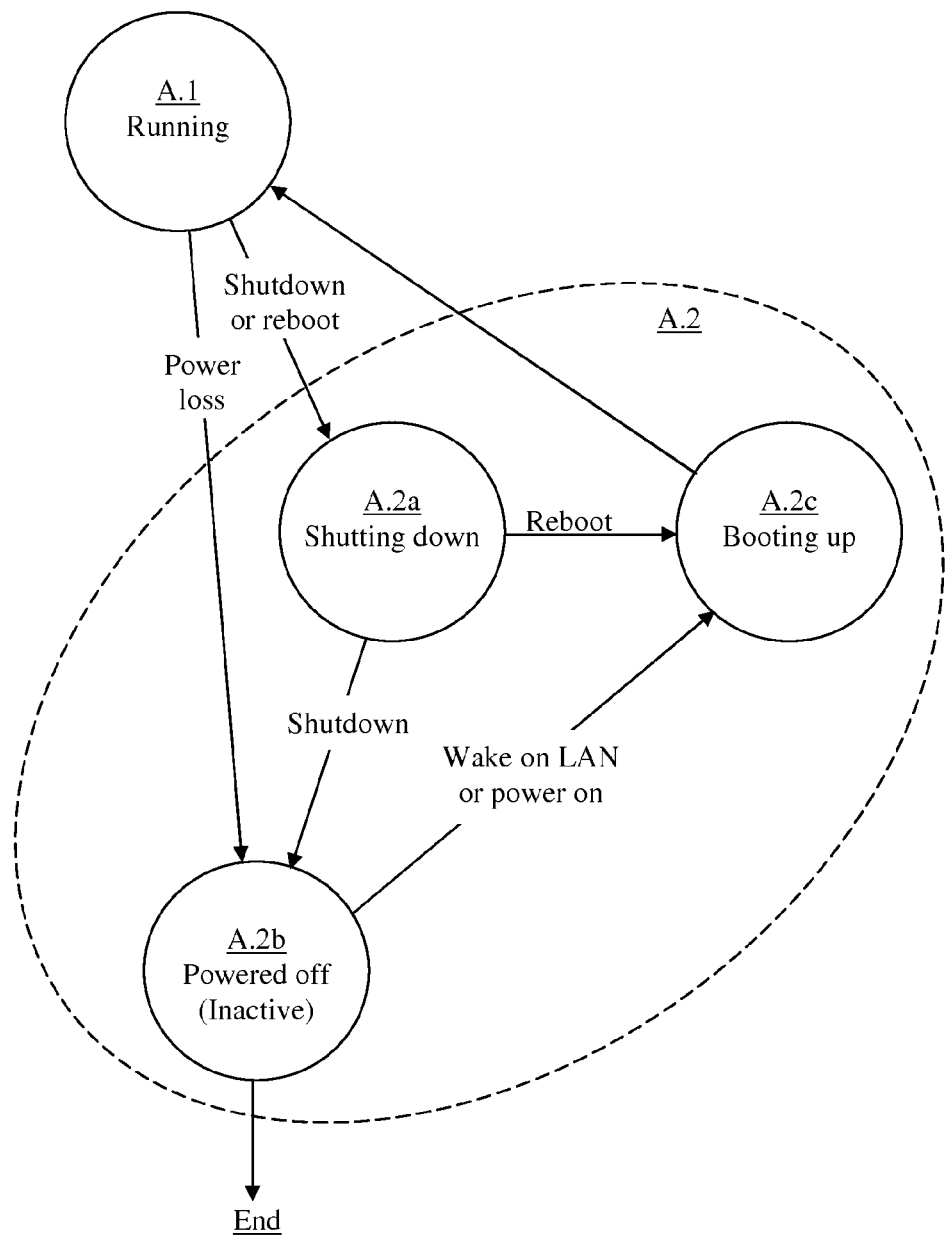
FIG. 5 schematically illustrates the cycling down process of a back storage system according to an embodiment of the present invention.

In FIG. 5, state A.1 may correspond to state A.W1*a*, A.W1*b*, A.R1*a*, A.R1*b*, or A.D1 in FIG. 4; states A.2*a*, A.2*b* and A.2*c* collectively constitute state A.2, which may correspond to state A.W2, A.R2 or A.D2 in FIG. 4.

As shown in FIG. 5, a storage unit can enter a cycling down state A.2 from a running state A.1 in response to a shutdown or reboot action initiated by control software or hardware of the storage unit, or in response to a power loss condition. In the case of a shutdown action, the storage unit performs an orderly shutdown process A.2*a*, and then enters the powered off state (i.e. the inactive state) A.2*b*. In the case of a reboot action, the storage unit performs an orderly shutdown process A.2a followed by a boot up process A.2c, whereby the storage unit returns to the running state A.1.

In the case of a power loss event (typically, in such an event, power is temporarily lost to the entire storage unit including the network card, followed by a resumption of power), the storage unit enters the powered off state A.2b without going through the orderly shutdown process A.2a.

From the powered off state A.2b, in response to a wakeup signal (e.g. Wake-on-LAN) from the landing pad, or an explicit power on (e.g. pressing a power switch on the storage unit server), the storage unit performs a boot up process A.2c, and enters the running state A.1.

The landing pad 11 may be implemented by a dedicated storage system or storage system pair. Each storage unit 12 may be implemented by a dedicated storage system. The storage systems may have any suitable hardware and software structures, such as a server connected to one or more mass storage devices. A storage system acting as a storage unit 12 may have different characteristics from one acting as the landing pad 11, being optimized for low cost, volume, and bootup time, while the landing pad is optimized for I/O responsiveness. Replacement storage systems may be used to provide redundancy. In one preferred embodiment, a storage system acting as a storage unit 12 may be recirculated or recycled after being emptied or tape-archived of the oldest data.

One particular preferred embodiment, described in more detail below, is implemented based on items of hardware and software that are standard and widely available. It is the combination of these items and the timing and use of them in the power saving archive system 10 that is new and unobvious.

These commonly found items include: the Wake-on-LAN capability that many if not most modern motherboards have; Samba (CIFS) or other NAS service to run on the landing pad, and its VFS (Virtual File System) capability that allows easy layering of special capability on the server's file structure; symlinks, and their robust implementation in many operating systems; the ability to order by timestamp; and efficient file transmission and storage protocols such as FTP.

In this preferred embodiment, the landing pad 11 executes modified NAS software, here Samba, and a software daemon with its configuration capability to manage the FTP connection and (where applicable) the passive landing pad system's symlink structure. The existence of user-space VFS makes the modifications of Samba modular and easy.

The Samba modifications of the preferred embodiment implement communication between the Samba instance and the daemon, as follows (refer to FIG. 6):

A Samba create (step S601) causes, instead of a file create, a symlink create pointing to a file create. A Samba create communicates with the daemon (step S601). In cases where the landing pad is full the daemon performs a file delete to make the landing pad ready (step S611). In cases where a storage unit is full the daemon performs a directory create (and scheduling of a storage unit move) to make the storage unit ready (step S611). A Samba create awaits communication from the daemon that these steps are complete.

A Samba create always precedes a Samba open (step S602), a Samba hot archive write (step S603), and a Samba close (step S604), and a Samba hot archive write always follows a Samba create, so that there is a one-to-one relation here. The daemon's actions make sure that the Samba open and write can follow without delay upon the client's request for a create.

A Samba close communicates to the daemon but does not await a return communication from the daemon (step S604). The first close after the file's create is a signal to the daemon to commence writing to a storage unit 12 (e.g. by FTP) (step S613).

A Samba open (step S602) communicates to the daemon and awaits a return communication from the daemon. In the open that immediately follows the create, this is preferably immediate (if the open and create are one command, then see create above for the behavior). Other opens (e.g. step S606), which are in response to a client read request (step S605) and are followed by Samba reads (step S607), may have to await action of the daemon to fetch the data (step S614). An open of an existing file to write is illegal in this preferred embodiment.

Samba writes and reads typically do not communicate with the daemon.

The daemon is structured and behaves as follows:

The daemon is configured to communicate with a number of Samba instances (e.g., via a named pipe) and with a number of storage units 12 (e.g., via IP addresses). The storage unit communication happens using FTP which therefore is configured also. This configuration of FTP sets it to write to one storage unit (e.g. 12a in FIG. 2) at a time, but to read from all storage units that contain valid data, even ones which are currently inactive. Therefore, preferably all storage unit IP addresses are static.

The daemon maintains a database relating all current symlinks with the file name and stats to which the symlink will point when there is data on the landing pad 11. The database also relates each symlink with the storage unit 12 on which its data is archived.

The daemon has the capability of sending a Wake-on-LAN command to any inactive storage unit 12, of monitoring whether any storage unit 12 is inactive, booting up, active, or shutting down. In addition, the daemon sends a shutdown command to any active storage unit that has been unused for a predetermined time period. In an alternative embodiment (less preferred), the daemon does not send the shutdown commands to the active storage units; rather, the active storage units enter the inactive state spontaneously upon being left unused for a predetermined time period, and the daemon merely queries the states of the storage units from time to time. The daemon maintains a database of all storage units 12, their fill status, and their state.

In the case of failover, the symlinks and these databases are communicated to the passive landing pad system 11b and maintained current there. That is the only activity of the daemon on the passive landing pad system 11b. The existence of promptly stored data on the hot storage unit (12a in FIG. 2) eliminates the need to copy data to the passive landing pad 11b, as a fail event will cause this data to be retrieved from the hot storage unit at need. Further description of the daemon will relate to the active landing pad system 11a only.

The daemon monitors the fill status of the landing pad 11. The daemon maintains an ordered list of all hot archive files and of all archive read files on the landing pad 11, in order to make appropriate deletes to ensure room.

The daemon responds to a communication from a Samba create (or create/open) by checking whether there is room for the file about to be written. If not, it forces delete of the oldest file(s) in the hot file area. It then creates the file and attaches it to the symlink and communicates back to Samba (or, alternatively, it creates the file and communicates back to Samba and Samba attaches it to the symlink).

It also checks whether there will be room for writing a copy of this newly created file on the hot storage unit 12a (see FIG. 2). If there will not be enough room, the daemon prepares a hot storage unit as follows. It triggers a wakeup (if necessary) of a second storage unit, which is either an unused storage unit or the oldest storage unit. The daemon does not need to wait for the wakeup process to complete on the second storage unit. This second storage unit now no longer has valid data (this corresponds to state A.D1 or A.D2 of FIG. 4). If no old archived data exists on the second storage unit, this storage unit is designated the hot storage unit. If old archived data exists on this second storage unit, then its data is deleted in the following manner. First, the read from archive directory corresponding to this storage unit is marked dead and deleted, so that no client reads from this storage unit can succeed, and after any ongoing reads are done, all symlinks pointing to this storage unit are deleted, and after the storage unit is powered up, all its data is deleted. After the second storage unit is empty of data, it is designated the hot storage unit and the FTP copy or copies are allowed to proceed to the storage unit. These actions correspond to step S611 in FIG. 6.

The daemon responds to a communication from a Samba close that follows a create/open/write of a new file by queueing the file for the FTP archiving to the hot storage unit.

If there is a file in the queue for archiving to the hot storage unit, the daemon responds to the up and empty state of the newly opened hot storage unit, or responds to the completion of FTP transmission of the previous file in the queue to the (already open) hot storage unit, whichever is applicable, by triggering the transmission of the file at the head of the queue to the storage unit. These actions correspond to step S613 in FIG. 6.

Figure 6:
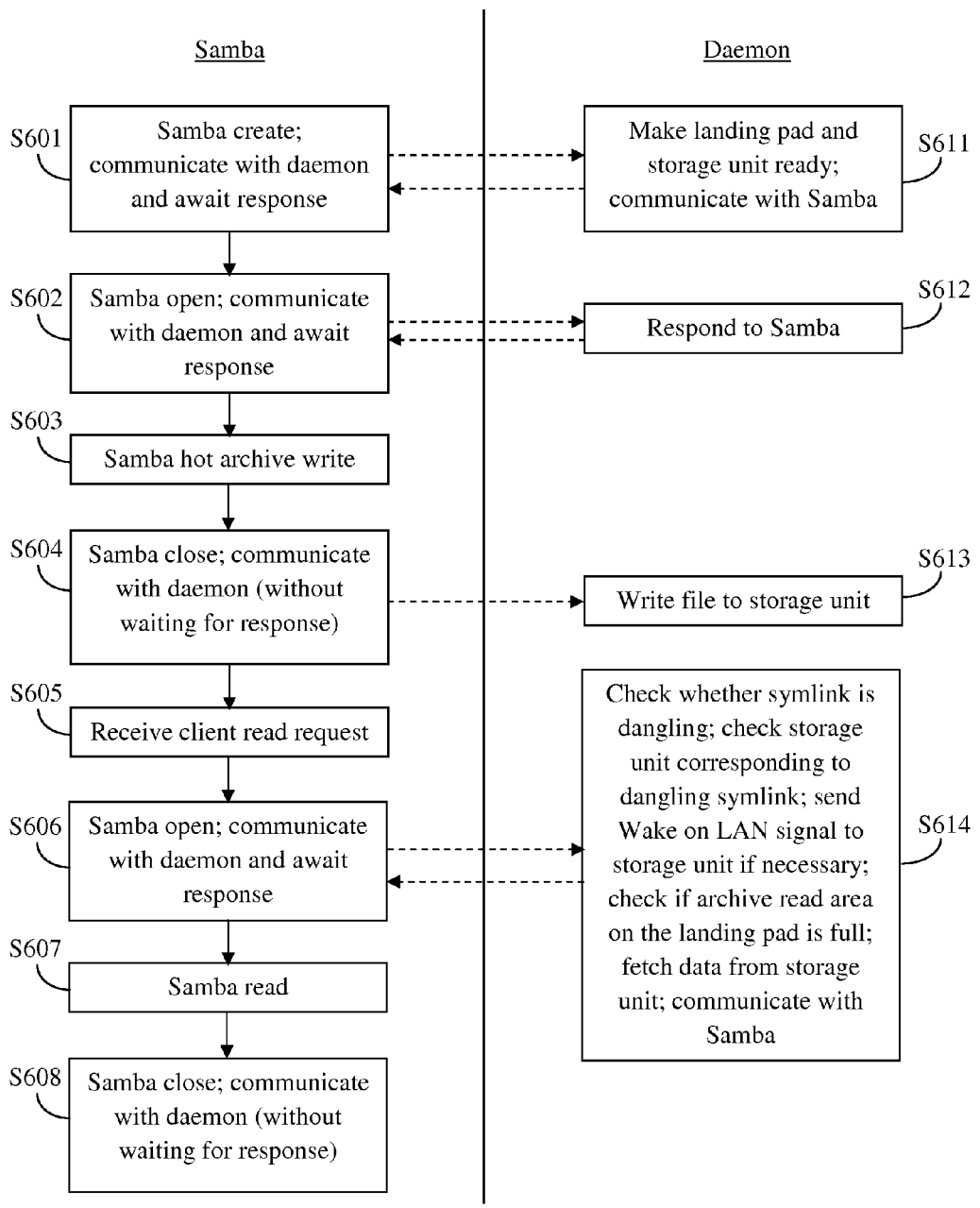
FIG. 6 is a flow chart illustrating processes performed by software of the landing pad according to an embodiment of the present invention.

The daemon responds to a Samba open for write immediately (step S612 in FIG. 6).

The daemon responds to a Samba open for read of a non-existing symlink with an error (this means the data has been deleted both from landing pad and from its storage unit). This also applies if the symlink is dangling and its storage unit has been marked dead.

The daemon responds to a Samba open for read of an existing symlink by checking whether the symlink is dangling. If it is not dangling (i.e. it points to an existing file on the landing pad), the daemon communicates back to Samba. If the symlink is dangling, the daemon checks the state of the storage unit corresponding to the symlink. If this storage unit is shutting down, the daemon waits for it to shut down. If the storage unit is shut down, the daemon sends it a Wake-on-LAN to make it boot up. If the storage unit is booting up, the daemon waits for it to come active. If the storage unit is active, the daemon checks whether the archive read area on the landing pad is full. If the archive read area on the landing pad is full, the daemon deletes the oldest file(s) in the archive read area to make room. If the storage unit is active and there is room in the archive read area of the landing pad, the daemon triggers an FTP read to the expected file in the storage unit and imposes the correct Posix stats on the resulting file in the landing pad. When this is complete, the daemon points the previously dangling symlink to this resulting file. When the symlink to the requested data is pointing at the data and not dangling, the daemon communicates back to Samba. These actions correspond to step S614 in FIG. 6.

Each storage unit 12 in this preferred embodiment contains two pieces of software: an FTP slave, and a script that performs an orderly shutdown to enter the inactive state (see FIG. 5) upon reception of a shutdown command from the landing pad 11. Alternatively (less preferred), in lieu of or in addition to the shutdown command from the landing pad, the storage unit 12 enters the inactive state spontaneously when it determines that it has been left unused (e.g., no read or write activities) for a predetermined time period. In addition, the BIOS of the storage device 12 is set capable of Wake-on-LAN, as shown in FIG. 5.

It will be apparent to those skilled in the art that various modification and variations can be made in the power saving archive system and related method of the present invention without departing from the spirit or scope of the invention. Thus, it is intended that the present invention cover modifications and variations that come within the scope of the appended claims and their equivalents.

What is claimed is:

1. A data archive system comprising:
a front storage system;
a plurality of back storage systems connected to the front storage system; and
a data connection for connecting the front storage system to a plurality of clients including a first client and a second client,
wherein in response to receiving a write command with a client file from the first client, the front storage system stores the client file in the front storage system, stores a reference to the client file in the front storage system, and writes the client file to one of the back storage systems,
wherein in response to receiving a read command from the second client specifying a requested file, the front storage system checks a reference to the requested file to determine whether the requested file is stored in the front storage system, wherein if it is, the front storage system transmits the requested file from the front storage system to the second client without communicating with the back storage systems, and wherein if it is not, the front storage system reads the requested file from a selected back storage system into the front storage system and transmits the requested file from the front storage system to the second client,
wherein each client file is stored in the back storage system as a Write Once, Read Many (WORM) file such that it is written only once and read zero or more times,
wherein one of the back storage systems is a hot back storage system which is currently being written to, wherein the front storage system writes client files to the hot back storage system only, until it is filled, and wherein the plurality of back storage systems are filled with client files in a time order sequentially, and
wherein each back storage system enters an inactive state after a predetermined time period of unuse, and wherein each inactive back storage system becomes active in response to receiving a wakeup command from the front storage system.

2. The data archive system of claim 1, wherein after writing the client file to the one of the back storage systems, the front storage system deletes the client file from the front storage system after a period of unuse.

3. The data archive system of claim 2, wherein the front storage system maintains a database relating each reference to a back storage system where the referenced file is written.

4. The data archive system of claim 1, wherein the front storage system maintains a database storing inactive or active states of each back storage system.

5. The data archive system of claim 4, wherein in response to the read command from the second client and when the front storage system determines that the requested file is not stored in the front storage system, the front storage system determines, using the database that stores inactive or active states of each back storage system, whether the selected back storage system is inactive or active, and if it is inactive, the front storage system transmits the wakeup command to the selected back storage system before reading the requested file from the selected back storage system.

6. The data archive system of claim 1, wherein the front storage system transmits a shutdown signal to each active back storage system after a predetermined time period of unuse of the back storage system, and wherein each back storage system enters the inactive state in response to receiving the shutdown signal from the front storage system.

7. The data archive system of claim 1, wherein the second client is different from the first client.

8. The data archive system of claim 1, wherein the front storage system includes a server and a mass storage device, and each back storage system includes a server and a mass storage device.

9. The data archive system of claim 1, wherein the inactive state of the back storage systems is a powered off state and the wakeup command is a Wake-on-LAN signal.

10. The data archive system of claim 1, wherein the front storage system implements a NAS (network-attached storage) protocol for client data access.

11. The data archive system of claim 1, wherein the front storage system and the back storage systems implement File Transfer Protocol for file communication between them.

12. A data archiving method implemented in a data archive system, the data archive system including a front storage system and a plurality of back storage systems connected to the front storage system, the method comprising:
  in response to receiving a write command with a client file from a first client, the front storage system storing the client file in the front storage system, storing a reference to the client file in the front storage system, and writing the client file in one of the plurality of back storage systems;
  in response to receiving a read command from a second client specifying a requested file, the front storage system checking a reference to the requested file to determine whether the requested file is stored in the front storage system;
    if the requested file is stored in the front storage system, the front storage system transmitting the requested file from the front storage system to the second client without communicating with the back storage systems; and
    if the requested file is not stored in the front storage system, the front storage system reading the requested file from a selected back storage system into the front storage system and transmitting the requested file from the front storage system to the second client;
  wherein each client file is stored in the back storage system as a Write Once, Read Many (WORM) file such that it is written only once and read zero or more times,
  wherein one of the back storage systems is a hot back storage system which is currently being written to, wherein the front storage system writes client files to the hot back storage system only, until it is filled, and wherein the plurality of back storage systems are filled with client files in a time order sequentially,
  each of the plurality of back storage systems entering an inactive state after a predetermined time period of unuse; and
  each inactive back storage system becoming active in response to receiving a wakeup command from the front storage system.

13. The method of claim 12, further comprising:
deleting the client file from the front storage system after a period of unuse of the client file.

14. The method of claim 13, further comprising:
the front storage system maintaining a database relating each reference to a back storage system where the referenced file is written.

15. The method of claim 12, further comprising:
the front storage system maintaining a database storing inactive or active states of each back storage system.

16. The method of claim 15, further comprising:
in response to a read command from the second client and when the front storage system determines that the requested file is not stored in the front storage system, the front storage system determining, using the database that stores inactive or active states of each back storage system, whether the selected back storage system is inactive or active, and if it is inactive, the front storage system transmitting the wakeup command to the selected back storage system before reading the requested file from the selected back storage system.

17. The method of claim 12, further comprising:
the front storage system transmitting a shutdown signal to each active back storage system after a predetermined time period of unuse of the back storage system; and
each back storage system entering the inactive state in response to receiving the shutdown signal from the front storage system.

18. The method of claim 12, wherein the second client is different from the first client.

19. The method of claim 12, wherein the inactive state of the back storage systems is a powered off state and the wakeup command is a Wake-on-LAN signal.

* * * * *